United States Patent [19]
Kim

[11] Patent Number: 5,838,312
[45] Date of Patent: Nov. 17, 1998

[54] SYNCHRONIZATION SIGNAL PROCESSING CIRCUIT FOR A MONITOR FOR PROTECTING THE CATHODE RAY TUBE

[75] Inventor: Young-Min Kim, Seoul, Rep. of Korea

[73] Assignee: Daewoo Electronics co., Ltd., Seoul, Rep. of Korea

[21] Appl. No.: 720,058

[22] Filed: Sep. 27, 1996

[30] Foreign Application Priority Data

Sep. 28, 1995 [KR] Rep. of Korea ................... 1995-32305

[51] Int. Cl.⁶ .............................. G09G 5/00; H04N 3/20
[52] U.S. Cl. .............................. 345/213; 345/11; 345/12; 348/173
[58] Field of Search ............................... 345/213, 11, 12; 348/173

[56] References Cited

U.S. PATENT DOCUMENTS

| | | | |
|---|---|---|---|
| 4,127,796 | 11/1978 | Henderson | 348/173 X |
| 4,275,338 | 6/1981 | Grocki et al. | 315/381 |
| 4,475,057 | 10/1984 | Morris | 348/173 X |
| 4,677,351 | 6/1987 | Brust et al. | 348/173 X |
| 4,677,430 | 6/1987 | Falkman et al. | 348/173 X |
| 5,034,665 | 7/1991 | Wignot et al. | 348/173 X |
| 5,321,339 | 6/1994 | Hunt | 348/173 X |

*Primary Examiner*—Steven J. Saras
*Assistant Examiner*—Seth D. Vail
*Attorney, Agent, or Firm*—Beveridge, DeGrandi, Weilacher & Young LLP

[57] ABSTRACT

The synchronization signal processing circuit of a monitor for protecting the cathode ray tube includes a rectifying unit for rectifying a synchronization signal supplied from the outside; a first inverting unit for inverting the rectified signal and generating a first inverted signal; a control unit for controlling the output of the first inverted signal according to the synchronization signal by being switched on; a second inverting unit for delaying the rectified signal for a predetermined time period, inverting the delayed rectified signal, and generating a second inverted signal; and a synchronization signal outputting unit for buffering the first and second inverted signals and applying the buffer signal to a microprocessor, a video signal processor and a deflection circuit respectively. Accordingly, even while there is no input from the keyboard for a certain time period, the fluorescent screen of the CRT can be protected since the point of the screen to which the video signal is injected changes.

12 Claims, 3 Drawing Sheets

SYNCHRONIZATION SIGNAL PROCESSING CIRCUIT FOR A MONITOR FOR PROTECTING THE CATHODE RAY TUBE

BACKGROUND OF THE INVENTION

1. Field of the Invention

The present invention relates to a monitor, more particularly to a synchronization signal processing circuit of a monitor for preventing the cathode ray tube (CRT) of a monitor from being damaged due to a video signal continuously injected into a certain point of CRT during the time period when no signal is inputted from the outside.

2. Description of the Prior Art

As shown in FIG. 1, a conventional monitor is constructed as follows. Reference numeral 1 indicates a synchronization signal processing circuit for rectifying a synchronization signal SYN inputted from the outside and for inverting a rectified signal 01 to input an inverted signal 02. Reference numeral 2 represents a microprocessor for receiving inverted signal 02 to select a mode of a monitor and for generating a control signal for controlling the monitor according to the selected mode.

Reference numeral 3 indicates a video signal processor for processing the video signal inputted from the outside and the control signal from microprocessor 2 to display a processed video signal on a screen, synchronizing the processed video signal with inverted signal 02, and injecting the processed video signal into the CRT.

Reference numeral 4 means a deflection circuit for generating a deflection signal according to inverted signal 02 and the control signal of microprocessor 2 and supplying a deflection coil with the deflection signal to deflect the processed video signal outputted from video signal processor 3 in a horizontal direction and a vertical direction.

At this time, synchronization signal processing circuit 1, as shown in FIG. 2, includes a rectifying unit 10 for rectifying the synchronization signal to output rectified signal 01 and an inverting unit 20 for inverting rectified signal 01 of rectifying unit 10.

The rectifying unit 10 and inverting unit 20 will be described more specifically later.

Capacitors 11 and 12 of rectifying unit 10 are connected in series to control the peaking of the synchronization signal inputted from the outside. Between the input terminal of capacitor 11 and the output terminal of capacitor 12, a diode 13 is connected with a resistor 14 to quickly discharge the voltage charged in capacitors 11 and 12. A cathode of diode 13 is connected to the output terminal of capacitor 11.

The output terminal of rectifying unit 10 is connected to the base of a transistor 21 of inverting unit 20 for inverting rectified signal 01. The collector of transistor 21 is connected to a resistor 22 for controlling the current outputted from transistor 21. The input terminal of resistor 22 is connected to a power source Vcc. The emitter of transistor 21 is connected to the ground.

According to synchronization signal processing circuit 1 constructed as described in the foregoing, the synchronization signal is applied to capacitors 11 and 12 of rectifying unit 10. Capacitors 11 and 12 control the peaking of the synchronization signal.

The signal outputted from capacitors 11 and 12 is discharged through diode 13 and resistor 14. Diode 13 and resistor 14 output rectified signal 01.

Rectified signal 01 is applied to the base of transistor 21 of inverting unit 20. Transistor 21 receives rectified signal 01, switches on, inverts rectified signal 01, and outputs inverted signal 02. The switching speed of transistor 21 is determined by the discharging speed of diode 13 and resistor 14.

Inverted signal 02 outputted from the collector of transistor 21 is applied to microprocessor 2, video signal processor 3 and deflection circuit 4 respectively.

Microprocessor 2 receives inverted signal 02, sets a mode of the monitor, and generates a control signal for controlling the monitor according to the selected mode.

Video signal processor 3 receives and processes inverted signal 02 of synchronization signal processing circuit 1 and the control signal of microprocessor 2 to display the signal inputted from the outside on a screen. The processed video signal is synchronized with inverted signal 02 and injected into the CRT.

Meanwhile, deflection circuit 4 generates the deflection signal according to inverted signal 02 and supplies the deflection coil with the deflection signal to deflect the signal processed in video signal processor 3 in horizontal and vertical directions.

Therefore, in a monitor in which a power saving mode is not provided, when there is no input signal from the outside after the video signal processed in video signal processor 3 is synchronized with output signal of synchronization signal processing circuit 1 and injected into the CRT, the video signal is injected into a certain point of the screen continuously. Accordingly, the fluorescent screen of the CRT becomes damaged.

SUMMARY OF THE INVENTION

Therefore, it is the object of the present invention to provide a synchronization signal processing circuit capable of protecting a cathode ray tube during the time period when no input signal is provided from the outside by changing the point of the screen to which a processed video signal is injected.

In order to achieve the above object of the invention, the synchronization signal processing circuit comprises a rectifying unit for rectifying a synchronization signal supplied from the outside; an inverting unit for inverting the rectified signal and generating a first inverted signal; a control unit for controlling the first inverted signal according to synchronization signal by being switched on; a second inverting unit for delaying the rectified signal for a predetermined time period, inverting the delayed rectified signal, and outputting a second inverted signal; and a synchronization signal outputting unit for buffering the supplied first and second inverted signals and applying the buffer signal to a microprocessor, a video signal processor and a deflection circuit respectively.

More specifically, the synchronization signal is applied to the rectifying unit. The rectifying unit rectifies the synchronization signal to output the rectified signal. The rectified signal is applied to the first inverting unit. The first inverting unit inverts the rectified signal and inputs the first inverted signal. Meanwhile, the synchronization signal is applied to the control unit and switches the control unit on. According to the switching state of the control unit a first inverted signal is outputted. At that time, the rectified signal is applied to a second inverting unit, and the second inverting unit delays the rectified signal for a predetermined time period. The delayed rectified signal is inverted and outputted as a second inverted signal. While the second inverted signal is outputted, the output of the first inverted signal is suspended according to the switching state of the control unit, and the second inverted signal is applied to the synchronization signal outputting unit. The synchronization signal outputting unit inverts the second inverted signal again. That is, the first inverted signal and the second inverted signal are outputted alternately as the control unit is switched on or off, and the video signal is injected into the CRT after synchronizing with the first or second inverted signal. Accordingly, even while there is no input from the keyboard for a certain time period, the fluorescent screen of the CRT can be protected from being damaged since the point of the screen to which the video signal is injected changes.

BRIEF DESCRIPTION OF THE DRAWINGS

The above-described object and advantages of the present invention will now be clarified to those skilled in the relevant art by reference to the accompanying drawings in which.

DESCRIPTION OF THE PREFERRED EMBODIMENT

Figure 1:
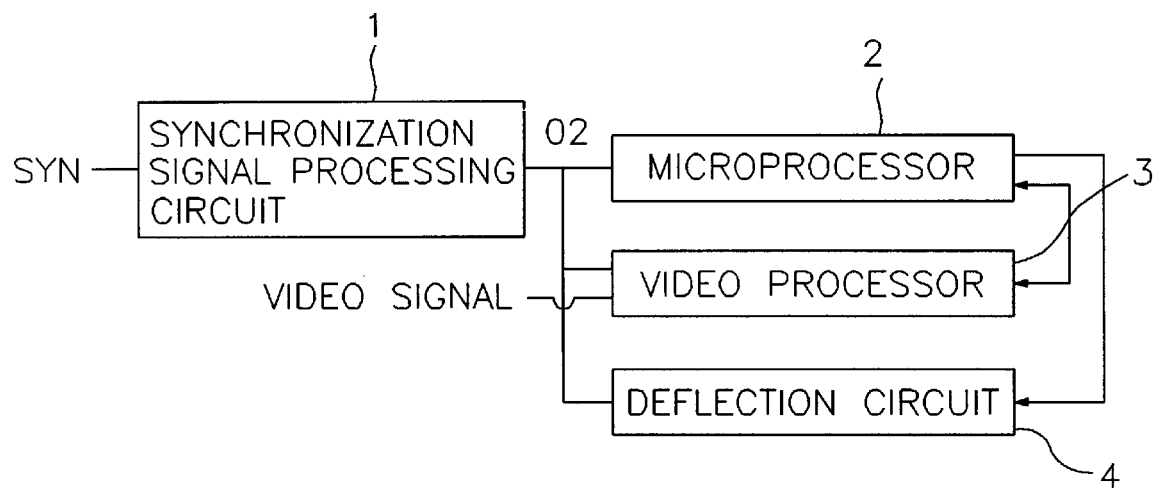
FIG. 1 is a view for showing the construction of a conventional monitor.
Figure 2:
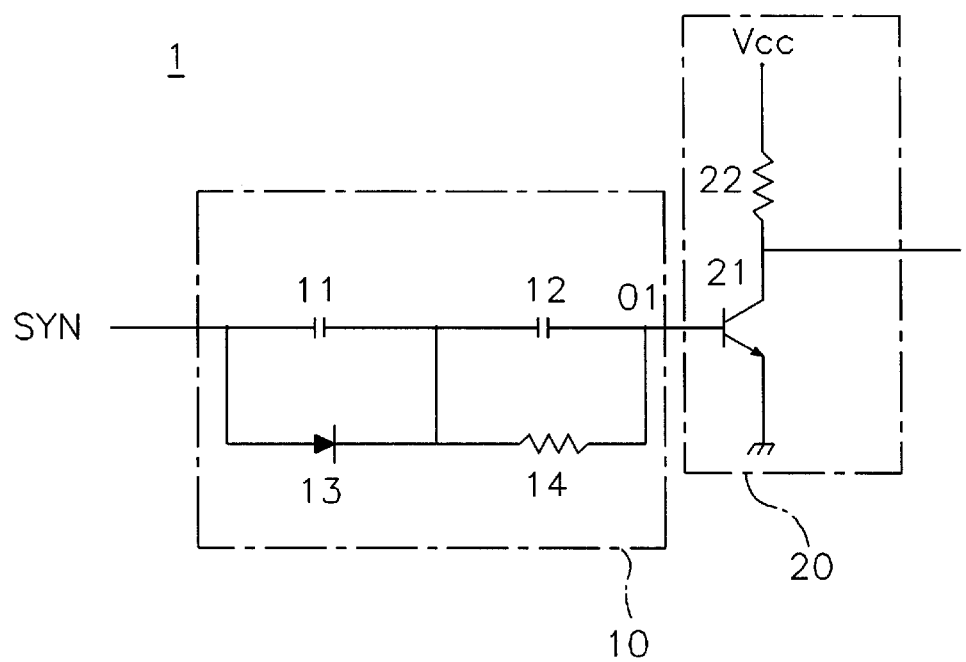
FIG. 2 is a view for showing the construction of the synchronization signal processing circuit of FIG. 1.

The present invention will be detailedly described by referring to the drawings.

Figure 3:
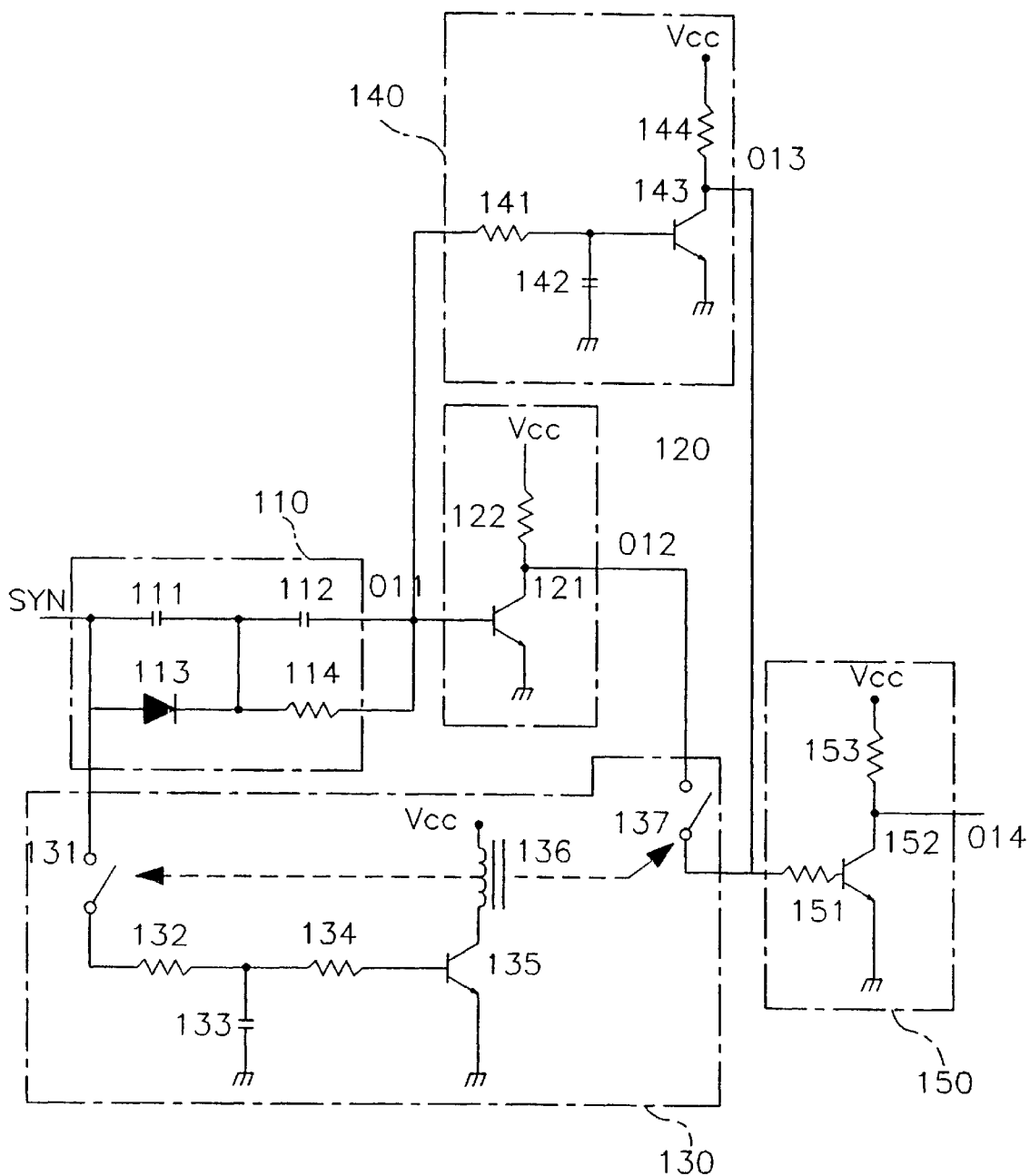
FIG. 3 is a view for showing the construction of the synchronization signal processing circuit according to the present invention.

FIG. 3 is a diagram for showing the construction of a synchronization signal processing circuit 100 for a monitor according to the present invention. As shown in FIG. 3, reference numeral 110 is a rectifying unit for rectifying a synchronization signal SYN supplied from the outside and outputting a rectified signal 011, and reference numeral 120 indicates a first inverting unit for inverting rectified signal 011 of rectifying unit 110 and generating a first inverted signal 012.

Reference numeral 130 means a control unit for controlling the output of the first inverted signal 012 of first inverting unit 120 by switching on/off according to the synchronization signal SYN. Reference numeral 140 is a second inverting unit for delaying rectified signal 011 of rectifying unit 110 for a predetermined time period, inverting the delayed rectified signal, and outputting a second inverted signal 013.

Reference numeral 150 represents the synchronization signal outputting unit for buffering the first inverted signal 012 of first inverting unit 120 or the second inverted signal 013 of second inverting unit 130 supplied according to the switching mode of control unit 130 and outputting a buffer signal 014.

More specifically describing synchronization signal processing unit 100, capacitors 111 and 112 of the rectifying unit 110 are connected to each other in series to control the peaking of synchronization signal SYN supplied from the outside. Between the input terminal of capacitor 111 and the output terminal of capacitor 112, a diode 113 is connected in series with a resistor 114 to quickly discharge the voltage charged in capacitors 111 and 112. The cathode of diode 113 is connected to the output terminal of capacitor 111.

The output terminal of rectifying unit 110 is connected to the base of a transistor 121 of first inverting unit 120 for inverting rectified signal 011. The collector of transistor 121 is connected to a resistor 122 for controlling the current outputted from transistor 121. The input terminal of resistor 122 is connected to a power source Vcc. The emitter of transistor 121 is connected to a ground.

Synchronization signal SYN is applied to one terminal of a first relay switch 131 of control unit 130. The other terminal of first relay switch 131 is connected to a resistor 132 for outputting a bias signal by biasing the synchronization signal SYN that has passed through the first relay switch 131. The output terminal of resistor 132 is connected to one terminal of capacitor 133 for charging or discharging the bias signal. The other terminal of capacitor 133 is connected to a ground.

Also, the one terminal of capacitor 133 is connected to a resistor 134 for biasing the voltage outputted from capacitor 133. The output terminal of resistor 134 is connected to the base of a transistor 135 for switching on or off according to the output of resistor 134.

The collector of transistor 135 is connected to a relay coil 136 through which electric current flows while transistor 135 is turning on. To the input terminal of relay coil 136 power source Vcc is supplied, and the emitter of transistor 135 is connected to a ground.

One terminal of a second relay switch 137 for suspending the output of the first inverted signal by switching to the OFF-state when the current flows through relay coil 136 is connected to the output terminal of first inverting unit 120. The other terminal of second relay switch 137 is connected to the input terminal of a synchronization signal outputting unit 150.

Also, a resistor 141 of a second inverting unit 140 for delaying rectified signal 011 of rectifying unit 110 for a predetermined time period is connected in series with a capacitor 142. The output terminal of resistor 141 is connected to the base of a transistor 143 for switching on or off as capacitor 142 is charged or discharged. The other terminal of capacitor 142 is connected to a ground.

The collector of a transistor 143 is connected to a resistor 144 for controlling the current outputted from transistor 143. The input terminal of resistor 144 is connected to a power source Vcc. The emitter of transistor 143 is connected to a ground.

Meanwhile, the output terminal of second relay switch 137 of control unit 130 and the output of second inverting unit 140 are connected to a resistor 151 of synchronization signal outputting unit 150 for outputting a bias signal by biasing first inverted signal 012 or second inverted signal 013. The output terminal of resistor 151 is connected to the base of a transistor 152 for outputting a buffer signal by inverting the bias signal.

The emitter of transistor 152 is connected to a resistor 153 for controlling the current from transistor 152. To the input of resistor 153 power source Vcc is supplied. The emitter of transistor 152 is connected to a ground.

Figure 4:
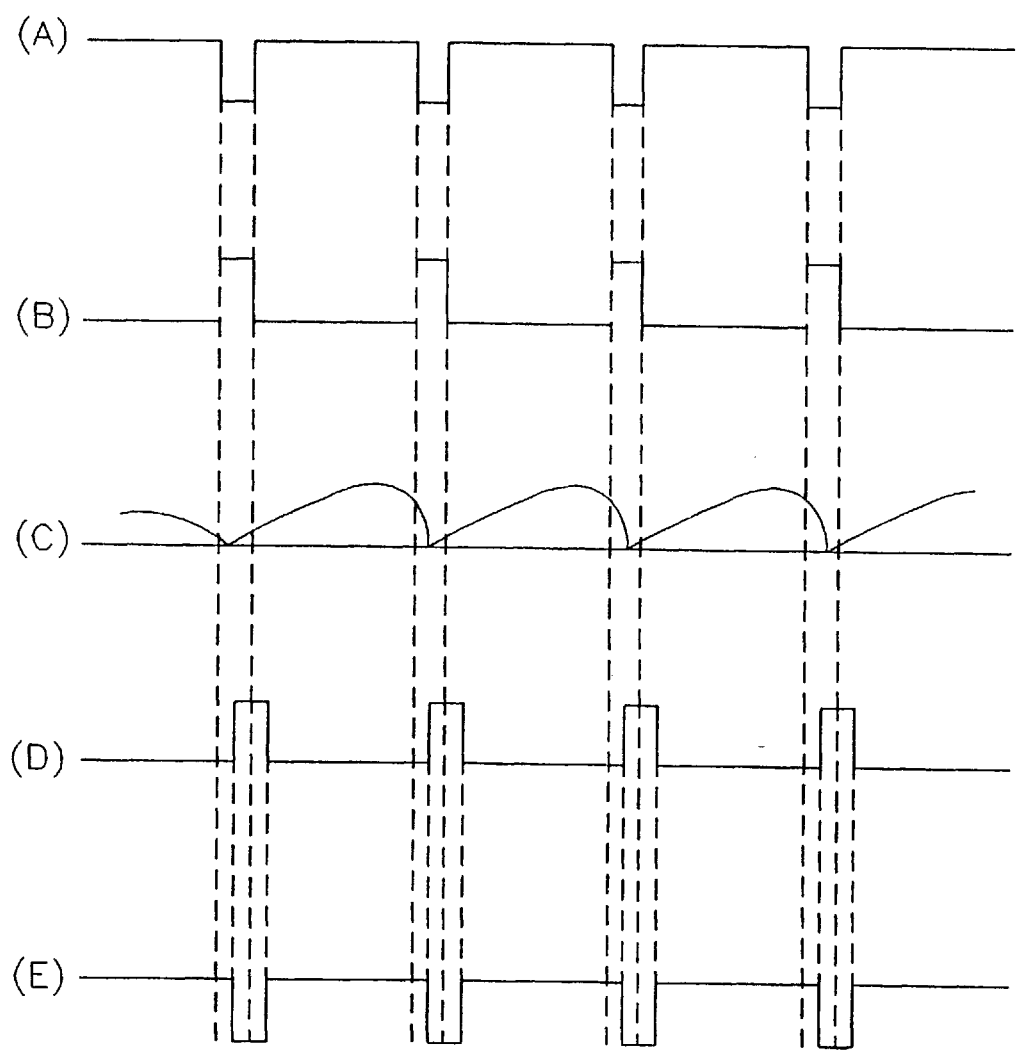
FIG. 4 is a view for showing output signals from each of the units of FIG. 3.

Synchronization signal processing circuit 100 for a monitor constructed as in the foregoing will be specified by reference to FIG. 4.

As shown in FIG. 4, section (A), inputted synchronization signal SYN is applied to capacitors 111 and 112 of rectifying unit 110. Capacitors 111 and 112 are charged according to synchronization signal SYN and output a charged signal. The charged signal is applied to diode 113 and resistor 114. Diode 113 and resistor 114 discharge the charged signal to quickly output the charged signal of capacitors 111 and 112, i.e., rectified signal 011.

Also, the rectified signal 011 of rectifying unit 110 is applied to the base of transistor 121 of first inverting unit 120. Transistor 121 inverts the rectified signal 011 and outputs first inverted signal 012. The first inverted signal 012 is as shown in FIG. 4, section (B).

Meanwhile, the synchronization signal SYN is applied to resistor 132 through the first relay switch 131 of control unit 130 which is connected first. Resistor 132 outputs the bias signal by biasing synchronization signal SYN. The bias signal is applied to capacitor 133 to be charged therein.

At that time, since no current flows through relay coil 136, the initial connection of second relay switch 137 is maintained. Through second relay switch 137, first inverted signal 012 is applied to resistor 151 of synchronization signal outputting unit 150. Resistor 151 outputs the bias signal by biasing first inverted signal 012. The bias signal is applied to transistor 152 and transistor 152 buffers the bias signal to output the buffer signal 014. Buffer signal 014 is as shown in FIG. 4, section (E).

Meanwhile, the rectified signal 011 of rectifying unit 110 is applied to capacitor 142 through resistor 141 of second inverting unit 140. Capacitor 142 makes the bias signal charged. Thus, the second inverted signal 013 is not outputted from the second inverting unit 140.

When capacitor 133 of control unit 130 has been charged after a predetermined time period, capacitor 133 is discharged according to the bias signal and the discharged voltage is applied to transistor 135 through resistor 134. Transistor 135 switches to the ON-state.

That is, since a current is applied from the collector to the emitter of transistor 135, the current also flows through relay coil 136. Also, since the current flows through relay coil 136, first relay switch 131 and second relay switch 137 are cut off, and the output of first inverted signal 012 is suspended.

Meanwhile, if capacitor 142 is charged, the charged signal of capacitor 142 is applied to transistor 143. Transistor 143 is switched on by the charged signal to output second inverted signal 013. Second inverted signal 013 is as shown in FIG. 4, section (D).

The second inverted signal 013 of second inverting unit 140 is applied to transistor 152 through resistor 151 of synchronization signal outputting unit 150. Transistor 152 outputs buffer signal 014 by buffering second inverted signal 013. Buffer signal 014 is as shown in FIG. 4, section (E).

After a certain time period, if capacitor 133 of control unit 130 is discharged completely, transistor 135 is switched off to bar the current from flowing through relay coil RL. Accordingly, first relay switch 131 is connected again with second relay switch 137.

By the second relay switch 137 being switched on, first inverted signal 012 is applied to synchronization signal outputting unit 150 again. By a series of the process being repeated, buffer signal 014 is outputted as shown in FIG. 4, section (E). The buffer signal 014 is applied to the video signal processor. The video signal processor synchronizes the video signal inputted from the outside with buffer signal 014 and injects the video signal into the CRT.

According to the present invention synchronization signal processing circuit for a monitor described as such, even while no signal is inputted from the outside for a certain time period, the point of the screen to which the video signal is injected changes to thereby protect the CRT against any damage.

The present invention was described by referring to the above preferred embodiment, however, it is recognized that numerous changes and modifications in the described invention will be apparent to those skilled in the art without departing from the spirit and scope.

What is claimed is:

1. A synchronization signal processing circuit of a monitor for protecting the cathode ray tube comprising:
   a rectifying means for rectifying a synchronization signal supplied from the outside;
   a first inverting means for inverting the rectified signal and generating a first inverted signal and controlling an output of the first inverted signal according to the synchronization signal;
   a second inverting means for delaying the rectified signal for a predetermined time period and generating a second inverted signal by inverting the delayed rectified signal; and
   a synchronization signal outputting means for buffering the first and second inverted signals and applying the buffer signal to a microprocessor, a video signal processor and a deflection circuit respectively.

2. The circuit as claimed in claim 1, wherein the first inverting means comprises an inverting means for inverting the rectified signal and generating the first inverted signal; and a control means for controlling the output of the first inverted signal by switching on or off according to the synchronization signal.

3. The circuit as claimed in claim 2, wherein the inverting means comprises a first transistor for inverting the rectified signal by switching on or off according to the rectified signal, and generatting a first inverted signal; and a second resistor connected between a power supply terminal and a collector of the first transistor to control current outputted from the first transistor.

4. The circuit as claimed in claim 2, wherein the control means comprises a first relay switch for passing the synchronization signal through by being switched on first; a third resistor for biasing the synchronization signal that has passed through the first relay switch; a first capacitor for being charged by the bias signal of the third resistor; a fourth resistor for biasing the voltage charged in the first capacitor; a second transistor for switching on or off according to the bias signal; a relay coil connected between a collector of the second transistor and a power supply terminal and through which an electric current flows when the second transistor is turned on; and a second relay switch for supplying the synchronization signal outputting means with the first inverted signal of the inverting means by connecting with the first relay switch as the current flows through the relay coil.

5. The circuit as claimed in claim 1, wherein the rectifying means comprises a plurality of capacitors connected in series with one another to control the peaking of the synchronization signal; and a diode and a first resistor connected in series between the plurality of capacitors to quickly discharge the plurality of capacitors.

6. The circuit as claimed in claim 5, wherein the plurality of capacitors means two capacitors.

7. The circuit as claimed in claim 1, wherein the second inverting means comprises a fifth resistor for biasing the rectified signal of the rectifying means; a second capacitor for delaying the output of the rectified signal by being charged according to the bias signal of the fifth resistor; a third transistor for inverting the charged signal by swiching on and generatting a second inverted signal; and a sixth resistor connected between a collector of the third transistor and a power supply terminal and for controlling current outputted from the third transistor.

8. The circuit as claimed in claim 1, wherein the synchronization signal outputting means comprises a seventh resistor for biasing the first inverted signal that has passed through the second relay switch of the control means or the second inverted signal of the second inverting means to output a bias signal; a fourth transistor for buffering the bias signal by being switched on and generatting a buffer signal; and an eighth resistor connected between a collector of the fourth transistor and a power supply terminal and for controlling current outputted from the fourth transistor.

9. A synchronization signal processing circuit of a monitor for protecting the cathode ray tube comprising:

a rectifying means for rectifying a synchronization signal supplied from the outside;

a first inverting means for inverting the rectified signal and generating a first inverted signal;

a control means for controlling the output of the first inverted signal according to the synchronization signal by being switched on;

a second inverting means for delaying the rectified signal for a predetermined time period, inverting the delayed rectified signal, and outputting a second inverted signal; and a synchronization signal outputting means for buffering the first and second inverted signals and applying the buffer signal to a microprocessor, a video signal processor and a deflection circuit respectively.

10. The circuit as claimed in claim 9, wherein the control means comprises a third relay switch for passing the synchronization signal through by being switched on first; an eighth resistor for biasing the synchronization signal that has passed through the third relay switch; a third capacitor for being charged by the bias signal of the eighth resistor; a ninth resistor for biasing the voltage charged in the third capacitor to output a bias signal; a fifth transistor for switching on or off according to the bias signal; a relay coil connected between a collector of the fifth transistor and a power supply terminal and through which an electric current flows when the fifth transistor is turned on; and a fourth relay switch for supplying the synchronization signal outputting means with the first inverted signal of the inverting means by connecting with the third relay switch as the current flows through the relay coil.

11. The circuit as claimed in claim 9, wherein the second inverting means comprises a tenth resistor for biasing the rectified signal of the rectifying means; a fourth capacitor for delaying the output of the rectified signal by being charged to the bias signal of the tenth resistor; a sixth transistor for invrting the charged signal of the fourth capacitor by being switched on and generatting a second inverted signal; and an eleventh resistor connected between a collector of the sixth transistor and a power supply terminal and for controlling current outputted from the sixth transistor.

12. The circuit as claimed in claim 9, wherein the synchronization signal outputting means comprises a twelfth resistor for biasing the first inverted signal that has passed through the second relay switch of the control means or the second inverted signal of the second inverting means; a seventh transistor for buffering the bias signal of the twelfth resistor by being switched on and generating a buffer signal; and a thirteenth resistor connected between a collector of the seventh transistor and a power supply terminal and for controlling current outputted from the seventh transistor.

* * * * *